United States Patent
Gentile et al.

(10) Patent No.: US 11,651,175 B2
(45) Date of Patent: May 16, 2023

(54) IMAGE AND QUICK ART RESPONSE CODE SYSTEM

(71) Applicant: Vitiprints, LLC, New York, NY (US)

(72) Inventors: Christopher T. Gentile, Pennington, NJ (US); Terrance Kaiserman, Butler, PA (US); John Gentile, Montclair, NJ (US)

(73) Assignee: Vitiprints, LLC, New York, NY (US)

( * ) Notice: Subject to any disclaimer, the term of this patent is extended or adjusted under 35 U.S.C. 154(b) by 0 days.

(21) Appl. No.: 17/891,452

(22) Filed: Aug. 19, 2022

(65) Prior Publication Data

US 2022/0405496 A1    Dec. 22, 2022

Related U.S. Application Data

(63) Continuation of application No. 17/011,195, filed on Sep. 3, 2020, now Pat. No. 11,455,480.

(60) Provisional application No. 62/896,810, filed on Sep. 6, 2019.

(51) Int. Cl.
*G06K 7/14* (2006.01)
*G06K 19/06* (2006.01)

(52) U.S. Cl.
CPC ......... *G06K 7/1417* (2013.01); *G06K 7/1413* (2013.01); *G06K 7/1491* (2013.01); *G06K 19/06103* (2013.01)

(58) Field of Classification Search
CPC ............ G06K 9/00671; G06K 7/1417; G06K 7/1491; G06K 19/06103
USPC ..................................... 235/462.1
See application file for complete search history.

(56) References Cited

U.S. PATENT DOCUMENTS

| | | | |
|---|---|---|---|
| 6,651,894 B2 | 11/2003 | Nimura et al. |
| 6,935,565 B2 | 8/2005 | Nimura et al. |
| 7,273,175 B2 | 9/2007 | Zhao et al. |
| 7,848,578 B2 | 12/2010 | Suomela et al. |
| 7,881,560 B2 | 2/2011 | John |
| 8,634,651 B2 | 1/2014 | Reynolds |
| 8,917,944 B2 | 12/2014 | Suomela et al. |
| 9,185,462 B2 | 11/2015 | Das et al. |
| 9,355,293 B2 | 5/2016 | Swayn et al. |
| 9,424,504 B2 | 8/2016 | Annamalai et al. |
| 9,990,560 B2 | 6/2018 | Decker et al. |

(Continued)

FOREIGN PATENT DOCUMENTS

CN    106096488 A    11/2016
EP    1741059 A1    1/2007

(Continued)

OTHER PUBLICATIONS

International Search Report including Written Opinion for PCT/US20/49129 dated Nov. 24, 2020; 18 pages.

*Primary Examiner* — Toan C Ly
(74) *Attorney, Agent, or Firm* — Lerner David LLP

(57) ABSTRACT

Disclosed herein are methods of using an augmented reality trigger to locate and/or read a Data Code in an image. A method according to this disclosure may include the step of using an augmented reality trigger in an image to initiate an augmented reality experience, locating portions of Data Code arrange in a plurality of locations within the image, and combining each of the Data Code portions for processing as a unified Data Code. The augmented reality trigger may be stored in a data set including location information to locate each of the Data Code portions. The data set may include information to combine the plurality of Data Code portions.

20 Claims, 9 Drawing Sheets

(56) References Cited

U.S. PATENT DOCUMENTS

| | | |
|---|---|---|
| 10,102,465 B2 | 10/2018 | Annamalai et al. |
| 10,147,028 B2 | 12/2018 | Ito et al. |
| 10,152,663 B2 | 12/2018 | Arce et al. |
| 2006/0196950 A1 | 9/2006 | Kiliccote |
| 2007/0242886 A1 | 10/2007 | St John |
| 2011/0134108 A1 | 6/2011 | Hertenstein |
| 2012/0224743 A1 | 9/2012 | Rodriguez et al. |
| 2016/0361599 A1 | 12/2016 | McKirdy |
| 2018/0197009 A1 | 7/2018 | Severn et al. |
| 2018/0297863 A1 | 10/2018 | Decker et al. |
| 2019/0244431 A1 | 8/2019 | Skidmore |
| 2019/0325279 A1 | 10/2019 | Wang et al. |

FOREIGN PATENT DOCUMENTS

| | | |
|---|---|---|
| EP | 2175394 B1 | 2/2013 |
| WO | 2005104033 A1 | 11/2005 |

IMAGE AND QUICK ART RESPONSE CODE SYSTEM

CROSS-REFERENCE TO RELATED APPLICATIONS

This application is a continuation of U.S. application Ser. No. 17/011,195, filed Sep. 3, 2020, which claims the benefit of the filing date of U.S. Provisional Application No. 62/896,810 filed Sep. 6, 2019, the disclosures of which are hereby incorporated herein by reference.

FIELD OF THE INVENTION

The present invention relates to a method of reading Data Code in an image using an augmented reality experience. The method may use a pattern generated by an augmented reality experience to locate and read Data Code.

BACKGROUND OF THE INVENTION

As used herein, "Data Code" shall mean a linear barcode, a matrix code or a two-dimensional machine readable codes such as bar codes, Quick Response ("QR") codes and Data Matrix codes. Data Code can include customized linear barcode and customized matrix code. Linear barcodes can include any one-dimensional code, and matrix barcodes can include any two-dimensional code. These codes contain data, which can be positioned or embedded within a base image. The Data Code can then be scanned by a suitable device such as a smartphone, tablet computer, custom reader device to be decoded and data within the Data Code can then be extracted and processed. As a practical matter, Data Code may include data used as a locator, identifier, or a tracker. The data may include any data that is used in linear barcodes, QR codes, Data Matrix codes, including an address or pointer to a website, application, product serial codes, product serial codes, product package date, product expiration date and other data.

Data Code can be concealed within the base image to minimize detection by a viewer in order to maintain the aesthetics of the base image. In general, large data sets will require large amounts of code. However, such large amounts of code is typically difficult to blend and conceal within an image, which is then printed on a package or a product. Further, detection and scanning of large amount of data embedded in a base image will require increased time and processing resources to run complex algorithms to detect and decode such data.

Therefore, there exists a need for an improved system and method to store large amounts of data within a base image, and to efficiently retrieve the data.

BRIEF SUMMARY OF THE INVENTION

Disclosed herein are systems including an image with an augmented reality trigger and Data Code, and methods for locating and the reading such Data Code in the image using an augmented reality experience.

In a first aspect of the present disclosure, a method of using an augmented reality trigger to read a Data Code in an image is provided. A method according to this aspect may include the steps using an augmented reality trigger in an image to initiate an augmented reality experience, locating portions of Data Code arrange in a plurality of locations within the image, and combining each of the Data Code portions for processing as a unified Data Code. The Data Code may be located through processing of information generated by the augmented reality trigger.

In accordance with this first aspect, the augmented reality experience may be stored in a data set including location information to locate each of the Data Code portions. The data set may include information to combine the plurality of Data Code portions.

Further in accordance with this first aspect, the Data Code may be a linear code.

Further in accordance with this first aspect, the Data Code may be a matrix code. The matrix code may be any of QR code and data matrix.

Further in accordance with this first aspect, each of the Data Code portions may be components of a composite Data Code.

Further in accordance with this first aspect, each of the Data Code portions may be an independent Data Code.

Further in accordance with this first aspect, each of the Data Code parts may be sized, shaped and/or colored to blend into the image to minimize visual identification of the Data Code parts by a viewer.

Further in accordance with this first aspect, the augmented reality experience may include general information about a product line. The Data Code may include product-specific information of a product from the product line.

Further in accordance with this first aspect, the augmented reality trigger may include a grid pattern information used to locate the Data Code.

Further in accordance with this first aspect, the method may include placing a device in a first location to locate the augmented reality trigger, initiating the augmented reality experience, locating each of the Data Code portions, combining the Data Code portions, and processing the Data Code while the device remains in the first location.

In a second aspect of the present disclosure, a method of using an augmented reality trigger to locate a Data Code within an image is provided. A method according to this aspect may include the steps of locating Data Code in an image, using an augmented reality trigger within the image to initiate an augmented reality experience, and processing the Data Code. The augmented reality experience may include a location information of the Data Code.

In accordance with this second aspect, the augmented reality experience may be stored in a data set. The data set may be stored on a device such as smartphone, tablet computer or any other augmented reality enabled device. The data set may be stored in a cloud-based storage system. The data set may include location information to locate the Data Code in the image.

Further in accordance with this second aspect, the Data Code may be a linear code.

Further in accordance with this second aspect, the Data Code may be a matrix code.

Further in accordance with this second aspect, the Data Code may be sized, shaped and/or colored to blend into the image to minimize visual identification of the Data Code by a viewer.

Further in accordance with this second aspect, the pattern may be a grid generated by the augmented reality trigger.

In a third aspect of the present disclosure, a method of locating a Data Code in an image is provided. A method according to this aspect may include the steps of generating a grid pattern on an image, breaking down a Data Code into a plurality of Data Code parts, and placing the plurality of Data Code parts on the image. The grid pattern may be generated on the image by using an augmented reality experience initiated by an augmented reality trigger. Each of the Data Code parts may be located with reference to the grid pattern such that the Data Code can be located and read by initiating the augmented reality experience.

In a fourth aspect of the present disclosure, an image with an augmented reality trigger and one or more Data Codes is provided. An image according to this aspect may include an augmented reality trigger and a Data Code comprising of a plurality of Data Code parts. The augmented reality trigger may be configured to initiate an augmented reality experience. The Data Code parts may be located in the image with reference to a grid generated by the augmented reality experience. The data set may include location information of the plurality of Data Code parts to allow a device to locate and combine the plurality of the Data Code parts and read the Data Code. The image may be a design, logo, picture or any other representation. The augmented reality trigger may be sub image configured to blend within the image to minimize visual identification of the augmented reality trigger. The augmented reality trigger sub image may be sized, shaped and/or colored to blend into the image. The plurality of Data Code parts may be sub images configured to blend within the image to minimize visual identification of the plurality of Data Code parts. The plurality of Data Code sub image may be sized, shaped and/or colored to blend into the image. The device may be an augmented reality enable device such as a smartphone, tablet computer, augmented reality glasses, etc.

In a fifth aspect of the present disclosure, a system including an image, an augmented reality trigger and a Data Code is provided. A system according to this embodiment may include an image with augmented reality trigger and a Data Code, a data set containing the augmented reality experience and location information of the Data Code. The image may be a picture, design, logo, symbol, icon, graphic mark, etc. The Data Code may be located with reference to a grid generated by the augmented reality experience. The data set may be stored in a cloud-based storage system.

In accordance with this fifth aspect, the system may include an augmented reality enabled device. The augmented reality device may be any of a smartphone, tablet computer, eyeglass and headset. The device may be placed in a first location with reference to the image to read the augmented reality trigger art, initiate the augmented reality experience, locate the Data Code parts, combine the Data Code parts and read the Data Code without moving from the first location.

In a sixth aspect of the present disclosure a method of initiating an augmented reality experience and a Data Code reading with a single scan performed by a device is provided. A method according to this aspect may include the steps of placing a device in a first location, performing a scan of an image to read an augmented reality trigger and a Data Code within the image, initiating an augmented reality experience in response to the augmented reality trigger, and processing information contained in the Data Code. A location information of the Data Code within the image may be generated by the augmented reality trigger such that the device may locate the Data Code during the scan from the first location.

The present invention implements a new system and defined herein as a Quick Art Response Code ("QAR Code") system where an augmented reality trigger is used to locate, read and/or process Data Code embedded within an image.

BRIEF DESCRIPTION OF THE DRAWINGS

A more complete appreciation of the subject matter of the present invention and the various advantages thereof can be realized by reference to the following detailed description, in which reference is made to the following accompanying drawings.

DETAILED DESCRIPTION

Disclosed herein are methods of using a QAR Code system in which an augmented reality trigger ("AR trigger") is implemented to locate Data Code in an image. Various methods to breakdown and locate the Data Code within an image using the AR trigger are described herein. Any AR-enabled device using image recognition can execute a QAR code by initiating the AR trigger to locate and read the Data Code placed in the image. As used herein, the term linear barcodes can include any one-dimensional code, and matrix barcodes can include any two-dimensional code. The term "augmented reality trigger" can include any initiator or trigger image configured to trigger an augmented reality experience. The terms "augmented reality art trigger" and "augmented reality trigger" will be used interchangeably and as such, unless otherwise stated, the explicit use of either term is inclusive of the other term. While the methods and systems of the present disclosure typically refer to, or provide examples of QR codes and data matrix codes, the methods and system of the present disclosure can be used with any linear or matrix barcode.

Figure 1:
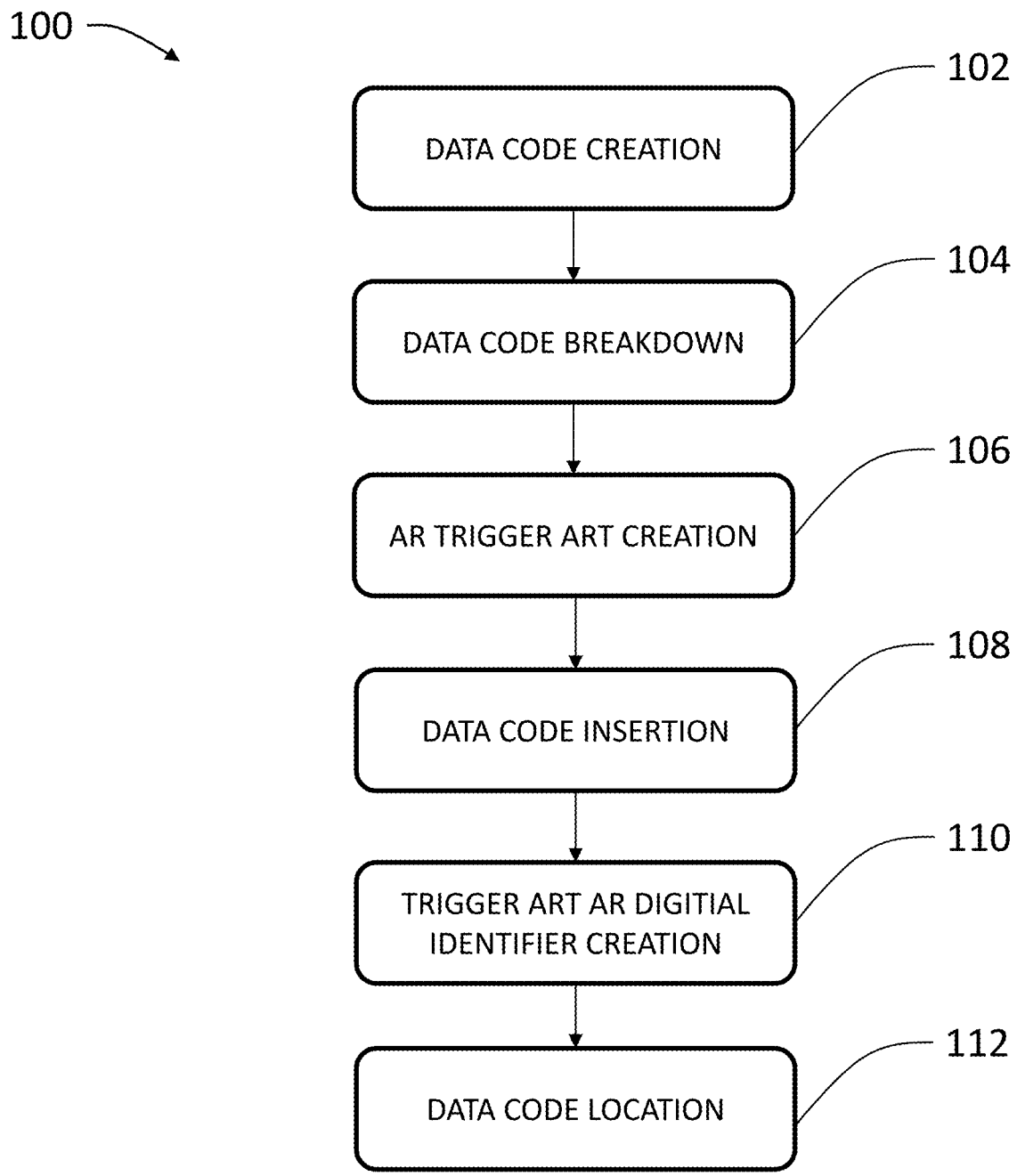
FIG. 1 is a flow chart describing steps for locating Data Code in an image using an augmented reality trigger according to one embodiment of the present invention.
Figure 3A:
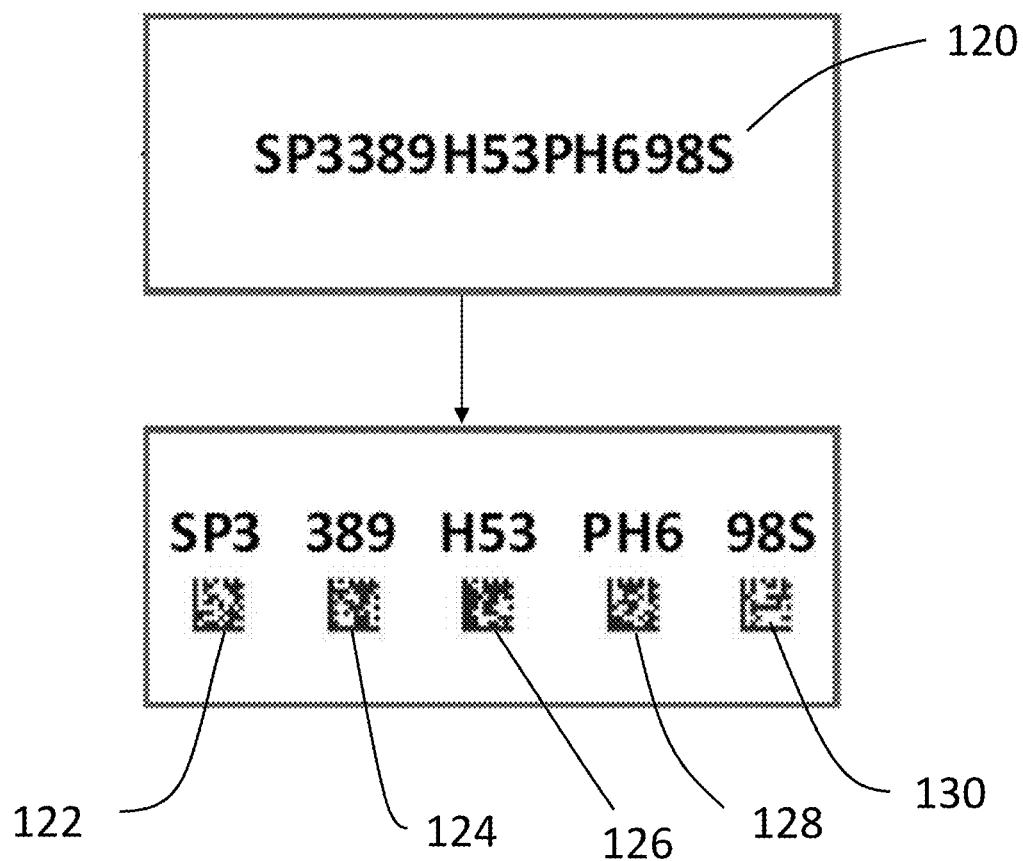
FIG. 3A is schematic view of a method of breaking down Data Code according to an embodiment of the present invention.
Figure 3B:
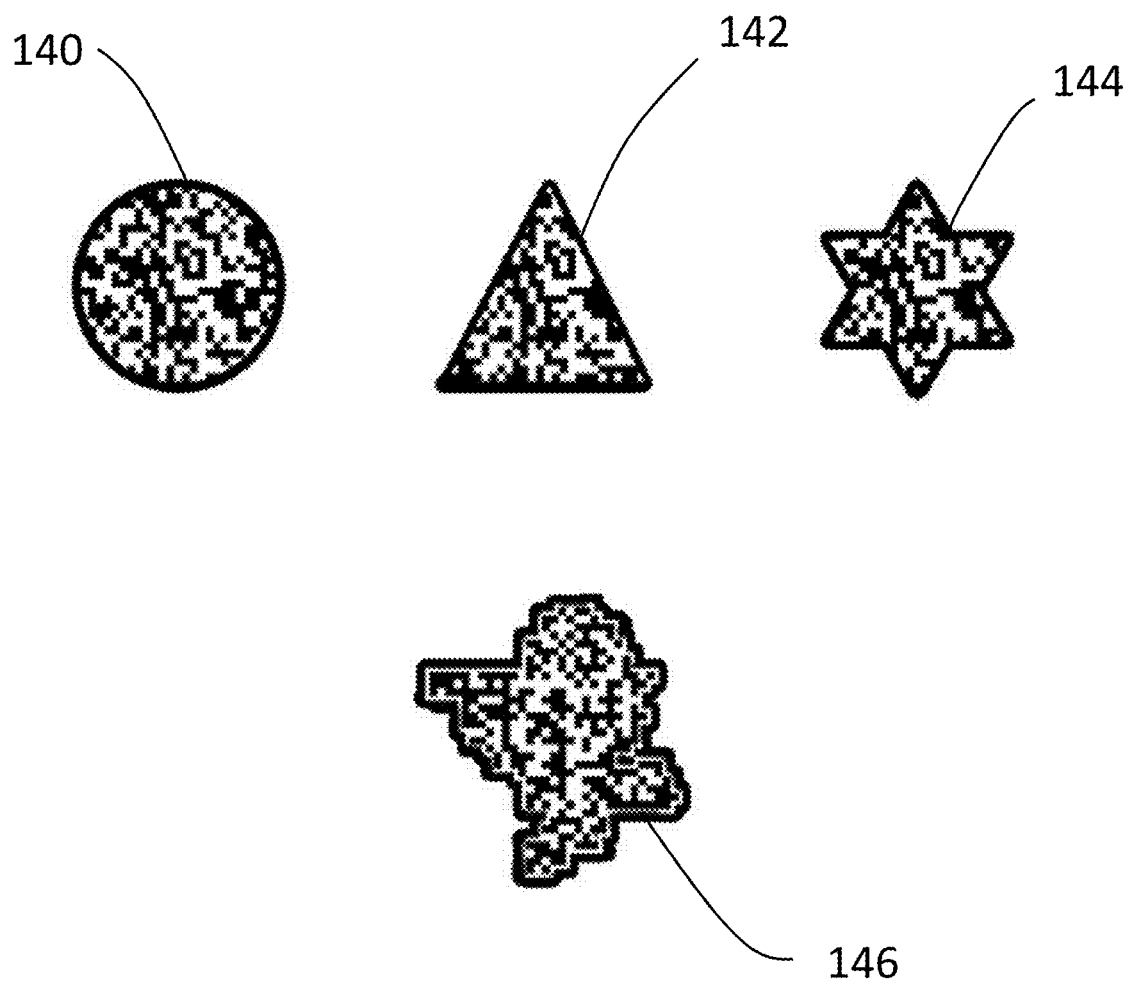
FIG. 3B is a schematic view of various uniquely shaped Data Code patterns used in conjunction with the steps described the flow chart of FIG. 2.

Referring to FIG. 1, there is shown a flow chart 100 describing use of a QAR Code system including steps for locating a Data Code in an image using an AR trigger according to an embodiment of the present disclosure. As more fully explained below, the image is QAR Code-enabled and can be a picture, design, logo, symbol, icon, graphic mark, etc. A Data Code containing the required data is created using standard library functions known in the art in step 102. The Data Code can be a linear barcode or a matrix barcode. For example, the Data Code can be a QR code, data matrix code, a postal code or any other standard code. In other embodiments, Data Codes can be customized by shape, size and color to blend into the image to minimize detection by a viewer while retaining the aesthetics of the image. Various customized uniquely shaped Data Codes are illustrated in FIG. 3B, which include a circular Data Code 140, a triangular Data Code 142 and a star-shaped Data Code 144. Customized Data Codes can be appropriately selected and placed within an image to enhance the image visibility and aesthetics.

The Data Code is broken down into separate parts in step 104. As shown in FIG. 3A, a Data Code 120 containing a data string is broken down into Data Code parts 122, 124, 126, 128 and 130. Each of the Data Code parts include data from Data Code 120. For example, Data Code part 122 includes 3 of the 15-chraracter Data Code 120. As shown in FIG. 3A, each of the Data Code parts can be individual Data Codes—i.e., a data matrix that can be scanned and read by a reading device such as a smartphone or a table computer. In other embodiments, the Data Code parts can be components of a single Data Code—i.e., the Data Code parts can be virtually assembled into a single seral code in order to read the Data Code. Breaking down the Data Code into parts allows for greater storage of data the image without impacting the aesthetics of the image—i.e., improved concealment of the Data Code. For example, a Data Matrix Code with a module size of 144×144 typically stores 2335 alphanumeric characters. However, the 144×144 Data Matrix Code will occupy a large portion of the image and impact image aesthetics. Using the QAR Code system and associated method disclosed herein, multiple Data Matrix codes having module sizes of 88×88 with each Data Matrix Code containing 862 alphanumeric characters can be strategically concealed within the image. Thus, greater information with minimal impact to image visualization can be achieved.

Figure 4:
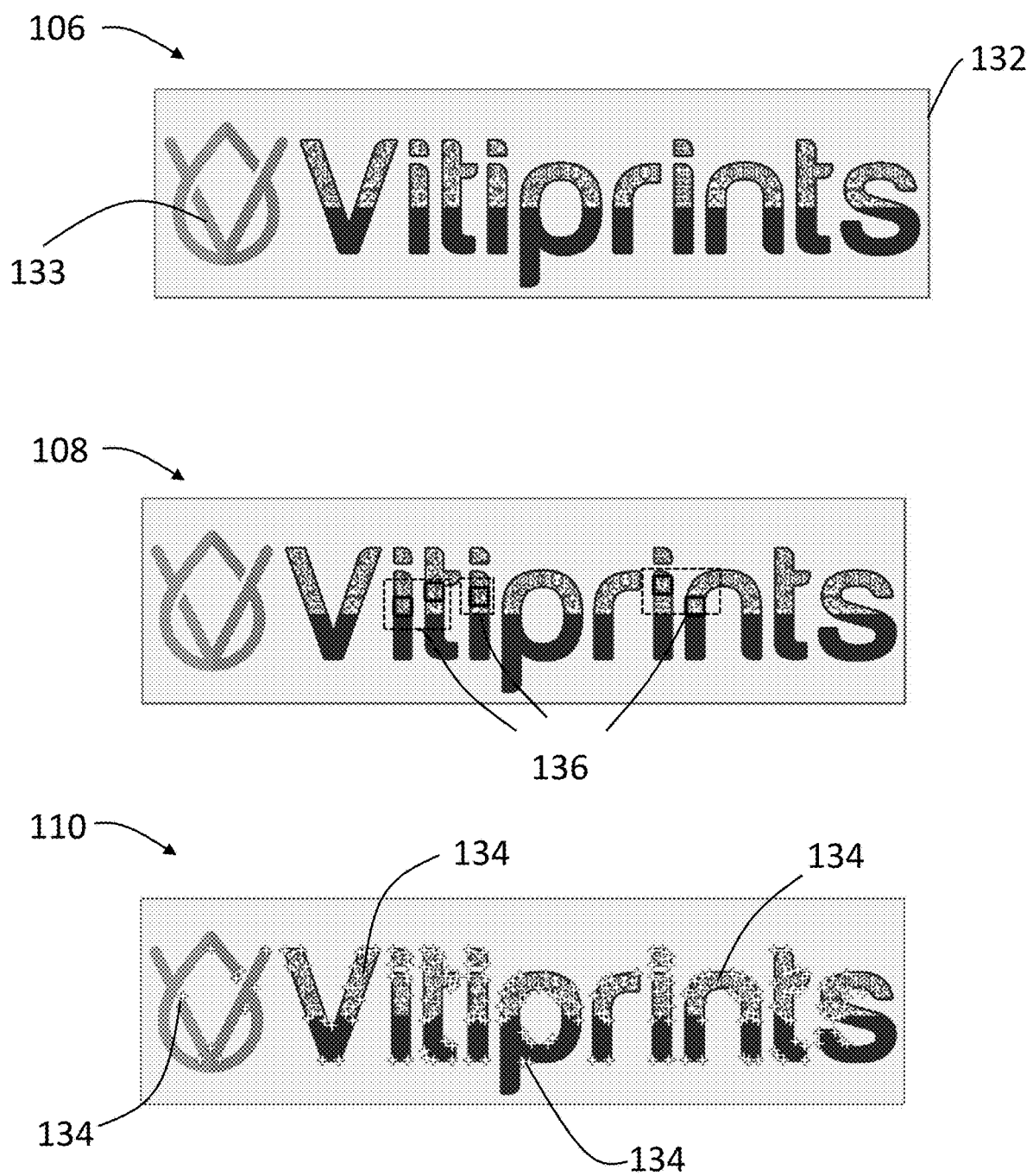
FIG. 4 is a schematic view showing steps for locating Data Code using an augmented reality identifier according to an embodiment of the present invention.
Figure 5:
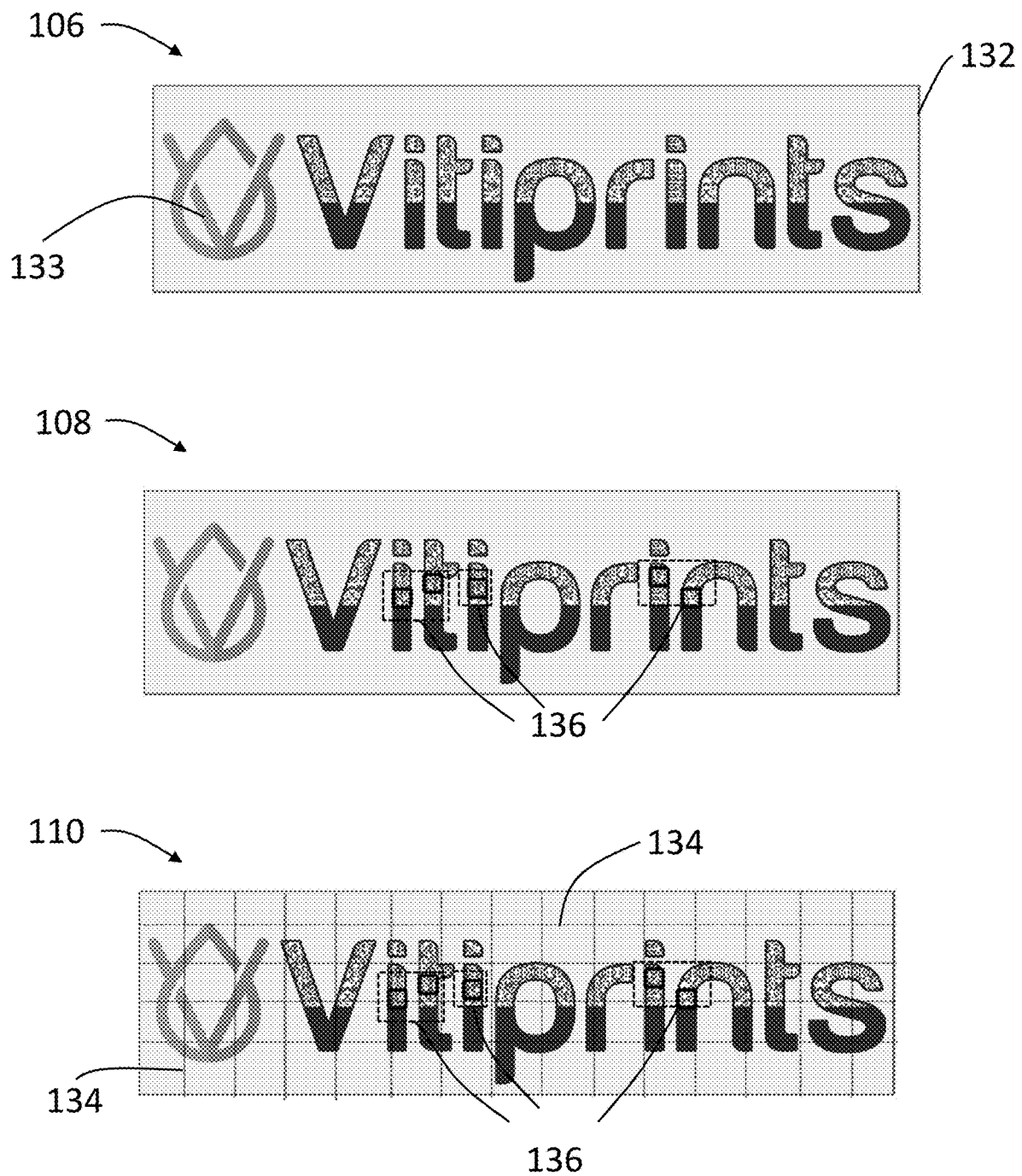
FIG. 5 is a schematic view showing steps for locating Data Code using an augmented reality trigger according to another embodiment of the present invention.
Figure 6:
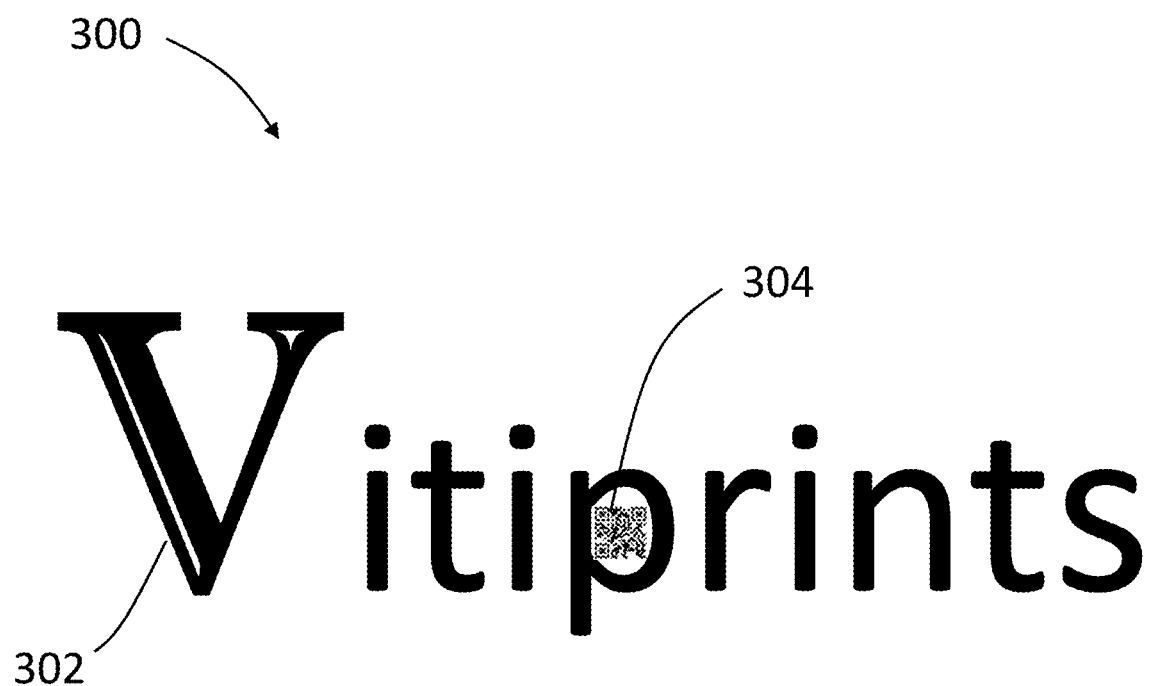
FIG. 6 is a QAR Code-enabled image containing an augmented reality trigger and Data Code according to an embodiment of the present invention.

Following step 104, an AR trigger art is created and placed in the image in a step 106. For example, FIGS. 4 and 5 illustrate an AR trigger art 133 in a QAR Code-enabled image 132. The AR trigger art 133 can be blended into the image to minimize visual impact and maintain the image aesthetics. For example, the letter "V," which is an integral part of image 132, is used as the AR trigger art in FIGS. 4 and 5. Similarly, any other image characters, or markings can be conveniently used to function as the AR trigger art. FIG. 6 illustrates another example of an AR trigger art 302 in an image 300. As shown in FIG. 6, the letter "V" serves as part of a logo and the AR trigger in image 300. The AR trigger or marker that can be read by an AR-enable device such as a smartphone or table computer to initiate the AR experience. The AR trigger art can be sized, shaped and/or colored to blend with the image to enhance image visibility and aesthetics.

Following step 106, Data Code parts are located on the image in a subsequent step 108. As shown in FIG. 4, Data Code parts 136 are strategically located on the image to preserve image visibility and aesthetics. Multiple Data Code parts can be conveniently concealed within the natural attributes of the image as shown in FIGS. 4 and 5.

Following step 108, an AR digital identifier is generated for the AR trigger art created in step 106. FIGS. 4 and 5 illustrate examples of an AR digital identifier 134. The digital identifier can be any image detection feature used by the AR experience to detect the target image. For example, FIG. 4 shows an AR digital identifier 134 which includes a plurality of position maker markers located throughout image 132. The position maker locations are created in reference to the Data Code part positioned in step 108. Once the location of the position makers or the grid is known by the AR-enabled device, the location of the Data Code parts located in reference to the position markers and the grid can be determined by the AR-enabled device in a step 112. The location information of each position marker is stored in the memory of the AR-enabled device such as a tablet computer or smartphone. In another embodiment, the location information can be stored on a cloud-based remote storage system which can be accessed by the AR-enabled device. This allows the AR-enabled scanning/reading device to locate the positions of each position marker once the AR experience is triggered through the AR trigger art.

FIG. 5 illustrates another example of AR digital identifier 134 which includes a grid pattern. Rows and columns of AR digital identifier 134 provide a framework to reference any position on image 132. For example, AR digital identifier is generated with reference to Data Code parts located in the image. Each Data Code part can now be identified and located based on the grid reference. For example, a specific Data Code part location can be identified as a specific row and column of the grid pattern. This location information is stored and communicated to the AR-enabled device to readily locate and read the Data Code part. Thus, locating, reading and encoding the Data Code parts is performed without the need for a search algorithm to scan and detect Data Codes in the image. Consequently, the Data Code part location information reduces the need for processing resources and time to read Data Codes in the image. While position markers (FIG. 4) and a grid (FIG. 5) are described here, other embodiments can have various other patterns or reference points distributed throughout the image to provide a reference framework of the image. While FIGS. 4 and 5 illustrate AR digital identifiers as positions markers and a grid pattern respectively, any other AR digital identifier such as color-contrasting patterns, digital identifiers, etc. can be used in other embodiments.

Figure 2:
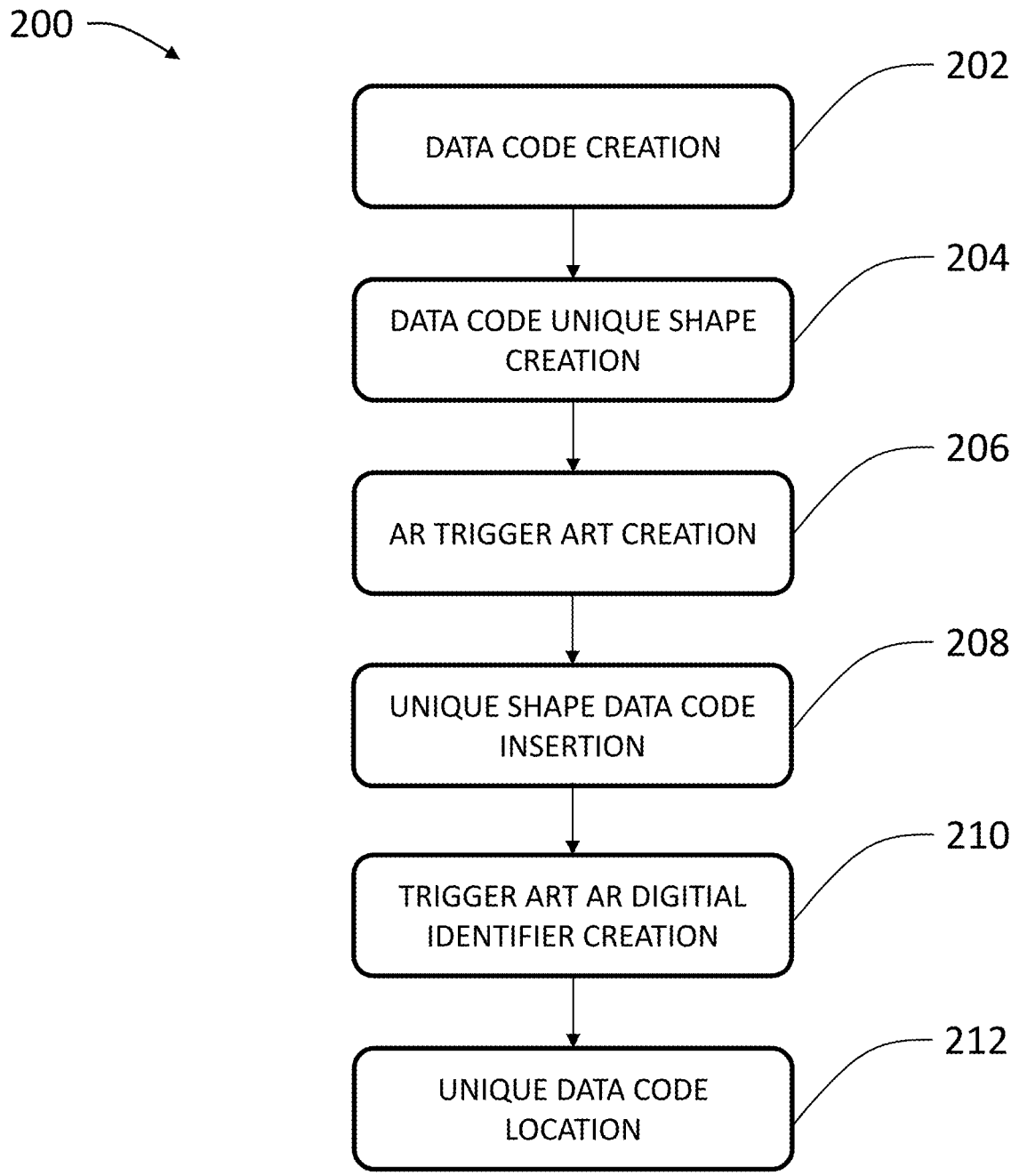
FIG. 2 is a flow chart describing steps for locating Data Code in an image using an augmented reality trigger according to another embodiment of the present invention.

FIG. 2 shows a flow chart 200 describing steps for locating a Data Code in an image using an AR trigger according to another embodiment of the present disclosure. Flow chart 200 is similar to flow chart 100, and therefore like steps are referred to with similar numerals within the 200-series of numbers. For example, flow chart 200 includes a step 202 to generate Data Code containing required data using standard library functions known in the art. However, flow chart 200 describes steps involving a custom-shaped Data Code 146 depicted in FIG. 3B. The custom-shaped Data Code facilitates easier concealment of the Data Code within the image to enhance image visualization. The Data Code parts of the custom-shaped Data Code can be broken down to match various features of the image to enhance image visibility and aesthetics.

FIG. 6 shows a QAR Code-enabled image 300 according to an embodiment of the present disclosure. Image 300 includes a Data Code 304 and an AR trigger art 302. In this embodiment, a single Data Code 304 is strategically located on image 300. An AR trigger identifier is not necessary to locate the Data Code in this embodiment. Thus, an AR-enable scanning device such as a smartphone or a table computer can initiate the AR experience via AR trigger art 302 and extract information from the Data Code 304 with a single scan of image 300.

Figure 7:
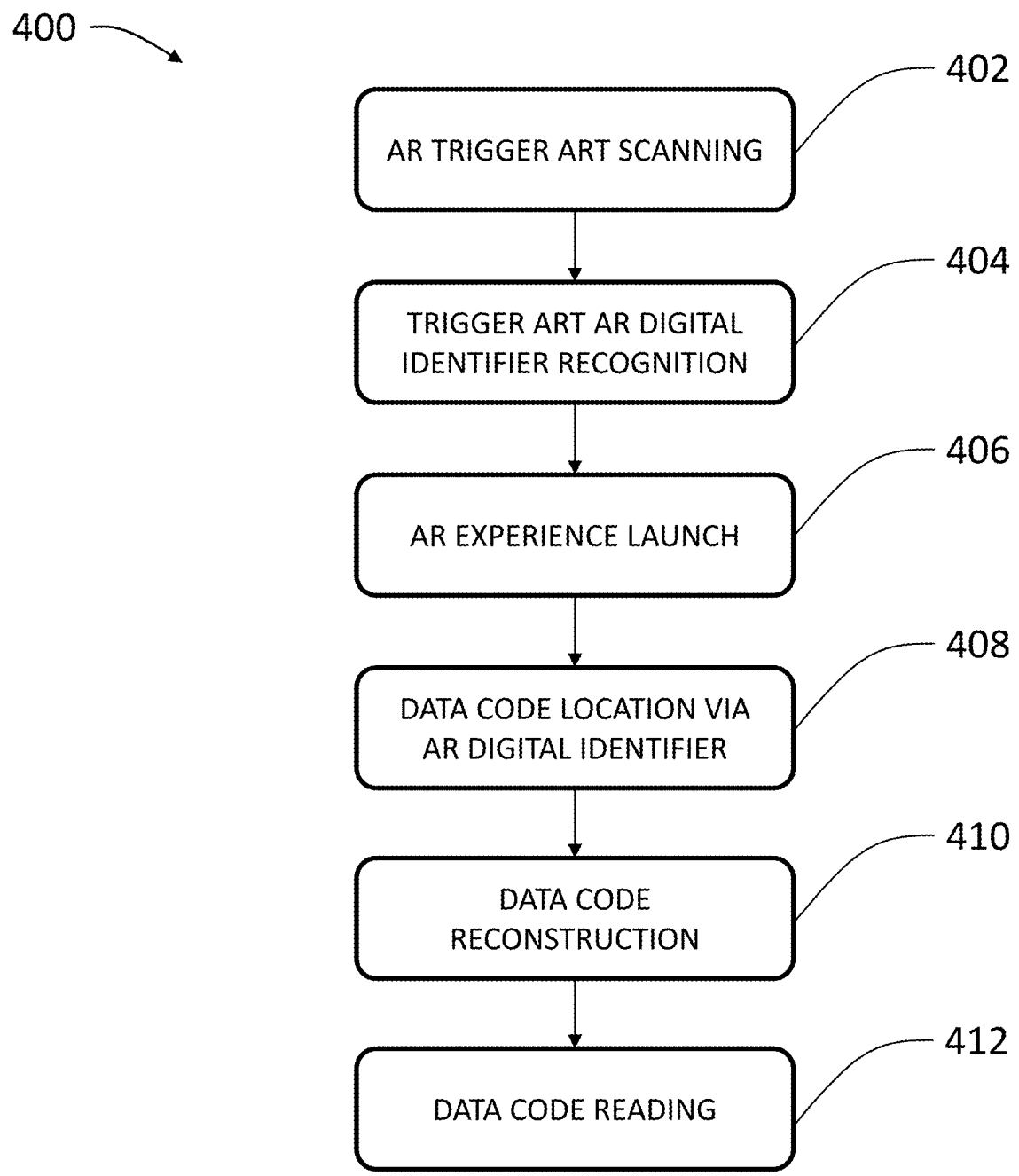
FIG. 7 is a flow chart describing steps for locating and processing Data Code in an image using an augmented reality trigger according to an embodiment of the present invention.
Figure 8:
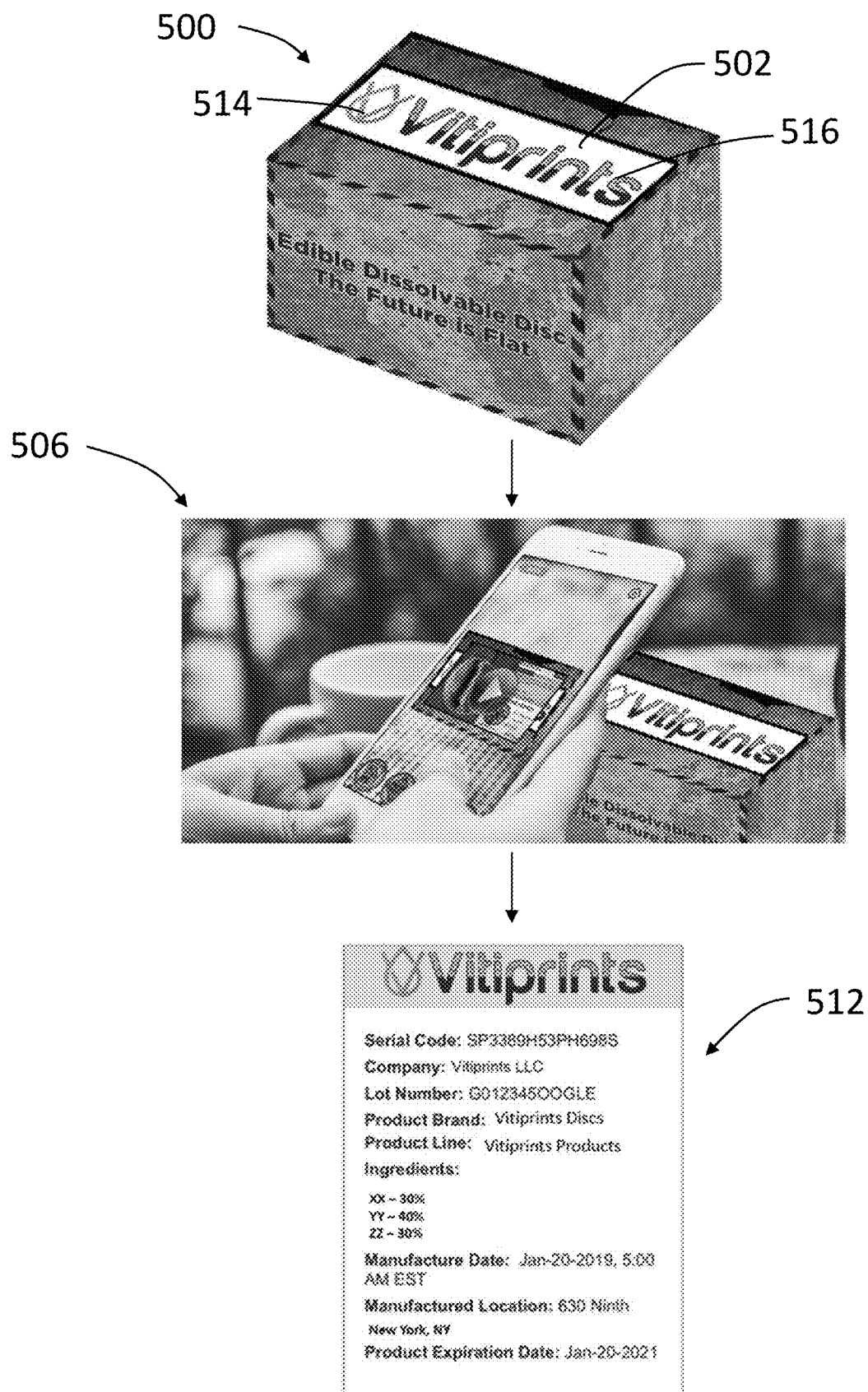
FIG. 8 is schematic view showing an augmented reality experience and Data Code located within a QAR Code-enabled image according to an embodiment of the present invention.

Referring to FIG. 7, there is shown a flow chart 400 describing steps for reading a Data Code in a QAR Code-enabled image using AR trigger art according to an embodiment of the present disclosure. An AR-enabled device such as smartphone, tablet computer, eyeglass, headset etc. is used to read the AR trigger art in a step 402. Once the AR trigger art is recognized by the AR-enabled device in step 404, the AR experience is launched in a step 406. As shown in FIG. 8, a product 500 which includes an image 502 with an AR trigger art is read by a smartphone to trigger the AR experience 506.

Following step 406, location of the Data Code or Data Code parts is determined by referencing the AR digital identifier in step 408. As more fully described above, the AR digital identifier can generate position markers or a grid to map the image. The Data Code parts can then be located by the smartphone, and reconstructed based on the location information stored in the AR-enabled device in a step 410. The reconstructed Data Code can now be read to extract the Data Code information 512 as shown in FIG. 8. Thus, a single reading or scan of image 502 using an AR-enabled device located in a single position is sufficient to generate the AR experience, locate and read the Data Code embedded in image 502—i.e., no translation of the AR-enabled device is necessary to perform these steps. A single reading to trigger the AR experience and read the Data Code will save time because multiple readings are not required. A single reading will also optimize computing resources because Data Code locations are stored in the image information available to the AR-enabled device thus requiring scanning and reading of the specific Data Code locations. Using an AR experience to locate and read various code types in an image allows for quick detection by the reading/scanning device. This will reducing processing resources and time to decode the code. Large data sets can be stored in the Data Code without impacting image quality.

Another aspect of the present disclosure is a QAR Code-enabled image containing an augmented reality trigger and one or more Data Codes as shown in FIG. 8. Image 502 includes augmented reality trigger 514 and the Data Code comprising of a plurality of Data Code parts 516. The augmented reality trigger may be configured to initiate an augmented reality experience. As shown here, image 502 is a label containing product labeling. In other embodiments, the image can be a design, logo, picture or any other representation. The augmented reality trigger 514 is part of image 502 and is configured to blend within the image to minimize visual identification of the augmented reality trigger. The augmented reality trigger sub image can be sized, shaped and/or colored to blend into the image. The plurality of Data Code parts are also sub images configured to blend within the image to minimize visual identification of the plurality of Data Code parts as best shown in FIG. 8.

Combining various code types allows for quick detection and large information storage without impacting image quality. For example, the augmented reality experience can include general information about a product line, and the Data Code can include product-specific information for each product from the product line. Thus, each product label can include a generic AR experience common to all product labels, and label-specific Data Code data that provides data regarding each label associated with a specific product. For example, a label created for a wine bottle using this method can include an AR experience that describes information of the winery and the type of wine, whereas the Data Code can provide specific information regarding each bottle such as bottling date, price, etc.

Initiating an augmented reality experience and reading Data Code currently require separate applications with separate scans being required for each of these experiences. In one embodiment of the present invention, the QAR Code system improves upon the prior art through an image that includes an augmented reality trigger and Data Code. By doing so, the QAR Code system enables initiation of the augmented reality experience and the Data Code reading, within a single app, and with just a single scan, allowing for the experience of the augmented reality and the Data Code to occur simultaneously or sequentially.

Furthermore, although the invention disclosed herein has been described with reference to particular features, it is to be understood that these features are merely illustrative of the principles and applications of the present invention. It is therefore to be understood that numerous modifications, including changes sequence of the method steps described herein, may be made to the illustrative embodiments and that other arrangements may be devised without departing from the spirit and scope of the present invention. In this regard, the present invention encompasses numerous additional features in addition to those specific features set forth in the paragraphs below. Moreover, the foregoing disclosure should be taken by way of illustration rather than by way of limitation as the present invention is defined in the examples of the numbered paragraphs, which describe features in accordance with various embodiments of the invention, set forth in the claims below.

The invention claimed is:

1. An image with an augmented reality trigger to read a Data Code, the image comprising:
    an augmented reality trigger located in a first location within an image, the augmented reality trigger configured to initiate an augmented reality experience, the first location defining a continuous area within the image, and
    a Data Code comprising a plurality of Data Code portions, each Data Code portions arranged in a plurality of second locations within the image, the plurality of second locations being located outside the first location,
    wherein the augmented reality trigger includes location information to locate each of the plurality of second locations and combine the Data Code portions to a unified Data Code.

2. The image of claim 1, wherein the augmented reality experience is stored in a data set including location information to locate each of the Data Code portions.

3. The image of claim 2, wherein the data set includes information to combine the plurality of Data Code portions.

4. The image of claim 1, wherein the Data Code comprises a linear code.

5. The image of claim 1, wherein the Data Code comprises a matrix code.

6. The image of claim 1, wherein the Data Code comprises a QR code.

7. The image of claim 1, wherein each of the Data Code portions are components of a composite Data Code.

8. The image of claim 1, wherein each of the Data Code portions comprise an independent Data Code.

9. The image of claim 1, wherein the Data Code is arranged to blend into the image to minimize visual identification of the Data Code by a viewer.

10. The image of claim 1, wherein the augmented reality trigger comprises grid pattern information used to locate the Data Code.

11. The image of claim 1, further comprises a device configured to be placed in a first location to locate the augmented reality trigger, initiate the augmented reality experience, locate each of the Data Code portions, combine the Data Code portions, and process the Data Code in the first location.

12. An augmented reality experience system comprising:
    an image with an augmented reality trigger located in a first location therein, the augmented reality trigger configured to initiate an augmented reality experience, the first location defining a continuous area within the image, a Data Code comprising a plurality of Data Code portions, each Data Code portions arranged in a plurality of second locations within the image, the plurality of second locations being located outside the first location, and a device configured to be placed in a first location to locate the augmented reality trigger, initiate the augmented reality experience, locate each of the Data Code portions from a location information of the augmented reality trigger, combine the Data Code portions, and process the Data Code in the first location.

13. The augmented reality experience system of claim 12, wherein the augmented reality experience is stored in a data set including location information to locate each of the Data Code portions.

14. The augmented reality experience system of claim 13, wherein the data set includes information to combine the plurality of Data Code portions.

15. The augmented reality experience system of claim 12, wherein the Data Code comprises a linear code.

16. The augmented reality experience system of claim 12, wherein the Data Code comprises a matrix code.

17. The augmented reality experience system of claim 12, wherein the Data Code comprises a QR code.

18. The augmented reality experience system of claim 12, wherein each of the Data Code portions are components of a composite Data Code.

19. The augmented reality experience system of claim 12, wherein each of the Data Code portions comprise an independent Data Code.

20. The augmented reality experience system of claim 12, wherein the Data Code is arranged to blend into the image to minimize visual identification of the Data Code by a viewer.

* * * * *